Oct. 28, 1969   L. W. WHITMER ET AL   3,474,663
VISCOSIMETER
Filed March 6, 1967   2 Sheets-Sheet 2
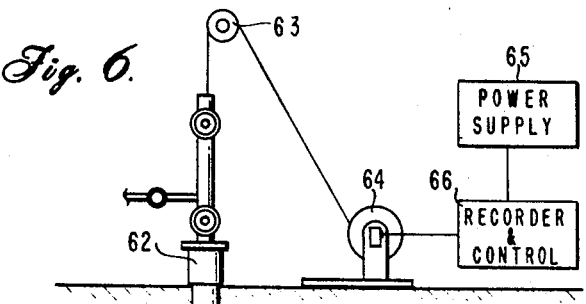
Fig. 6.
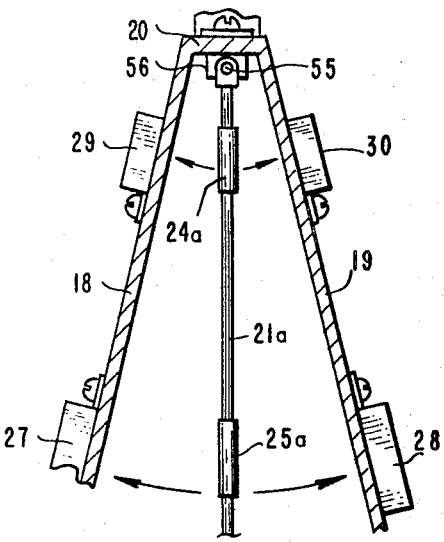
Fig. 5.
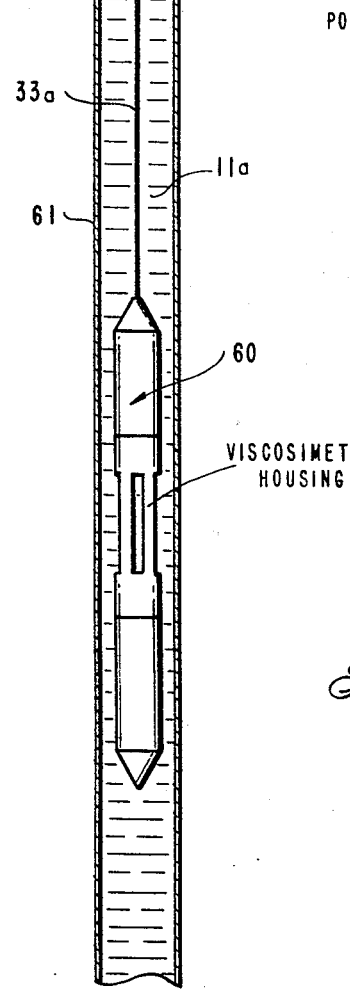
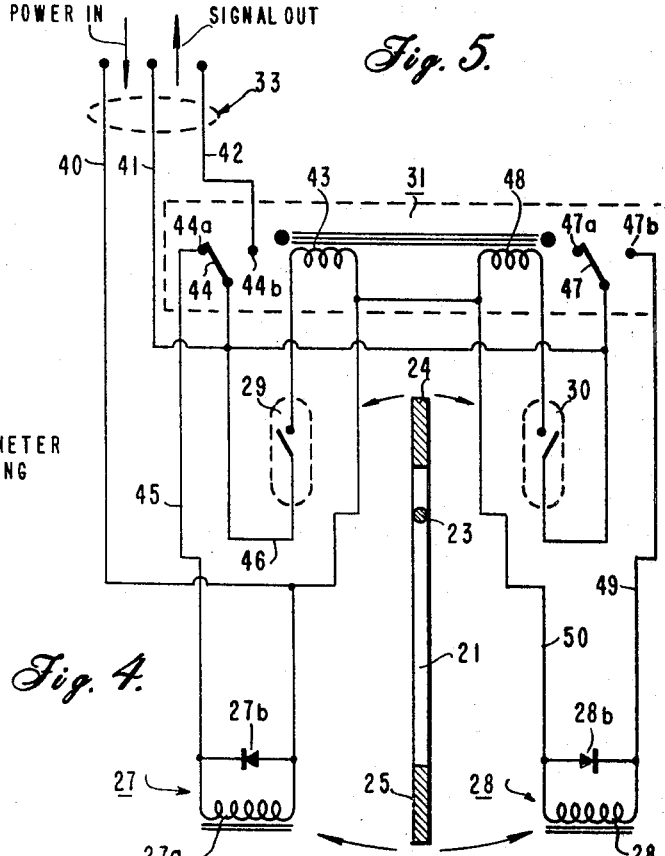
Fig. 4.
INVENTORS.
LAWRENCE W. WHITMER,
CLAUS W.W. GEWERS,
BY ALLAN S. McLATCHIE,
John D. Schneider
ATTORNEY.

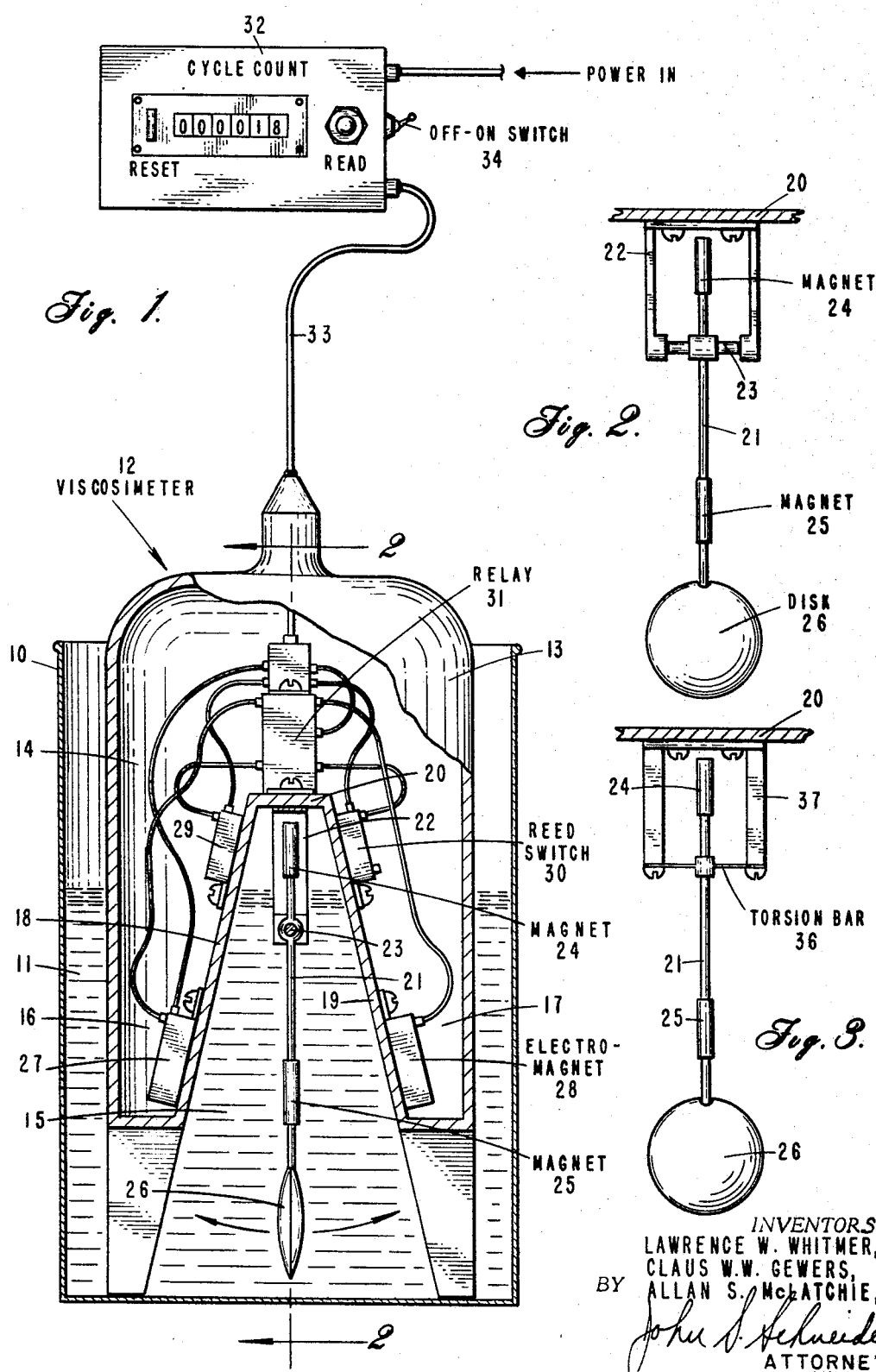

United States Patent Office 3,474,663
Patented Oct. 28, 1969

3,474,663
VISCOSIMETER
Lawrence W. Whitmer, Claus W. W. Gewers, and Allan S. McLatchie, Calgary, Alberta, Canada, assignors to Esso Production Company, a corporation of Delaware
Filed Mar. 6, 1967, Ser. No. 621,001
Int. Cl. G01n 11/16
U.S. Cl. 73—54                 4 Claims

ABSTRACT OF THE DISCLOSURE

An apparatus for measuring the viscosity of a fluid having a housing with alternately energizable electromagnets on opposite sides thereof. A movable member suspended from the housing has a magnet thereon aligned with the electromagnets such that alternate energizing of the electromagnets causes the movable member to oscillate in the test fluid. The velocity of oscillation of the movable member is a measure of the viscosity of the fluid.

---

The present invention concerns viscosimeters and particularly viscosimeters of the type useful in making viscometric measurements on fluids found in oil and gas wells.

The apparatus in accordance with the present invention briefly comprises a housing; a movable member suspended from said housing and immersed in a fluid, the viscosity of which it is desired to measure; energizable means for causing the movable member to move back and forth in said fluid; and means for indicating velocity of movement of said movable member and thereby viscosity of the fluid. Preferably, the movable member is an armature which is caused to oscillate in the fluid between two spaced-apart, alternately energized electromagnets. The apparatus is adaptable for use downhole in a well or in a laboratory or in other surface applications.

Downhole in a well, information may be supplied by the instrument on the location of oil-water and gas-oil interfaces. Frequently, such fluid content information is useful and necessary to interpret well behavior. Existing downhole tools, when employed to obtain fluid contacts, often fail to provide such information. Additionally, when used as a viscosimeter, the instrument is capable of providing information on the flow characteristics in the well; i.e., whether there is slug flow, foaming, etc. Downhole emulsions may change or deteriorate substantially while being brought to the surface. Consequently, in situ measurements downhole in the well are important. Further, determinations of absolute viscosities of well fluids downhole are now possible. Such determinations are especially important where bottom hole fluid samples cannot be retrieved under pressure.

When used in the laboratory, emulsions and mineral contaminated fluids, slurries of tar sands, drilling muds, asphalts, etc., can be studied. In many of these applications, no suitable instrument is presently available.

The viscosimeter of the present invention is also useful for continuous monitoring of drilling fluids during drilling operations and for continuous pipeline control. The latter application is especially useful when the pipeline is used for the shipment of batches of crude oils or refined products. The viscosimeter of the present invention could also be used for continuous control in various manufacturing processes.

Thus, a primary object of the present invention is to provide an instrument capable of measuring the viscosities of fluids which encompasses a wide range of applications.

The above object and advantages and other objects and advantages of the invention will be apparent from a more detailed description thereof when taken with the drawings wherein:

FIG. 1 is an elevational view, partly in section, illustrating one embodiment of the viscosimeter apparatus, including a cycle counter, in operating position;

FIG. 2 is a fragmentary view taken on lines 2—2 of FIG. 1;

FIG. 3 is a view similar to that shown in FIG. 2 illustrating another form of suspension for the movable member;

FIG. 4 is a schematic illustration of the movable member together with a circuit diagram of switches and electromagnets in operating position;

FIG. 5 is a sectional view of a portion of the viscosimeter illustrating another arrangement of the movable member and suspension therefor; and FIG. 6 is a sectional view of a well showing the viscosimeter apparatus positioned therein and associated surface apparatus.

Referring to the drawings in greater detail, in FIG. 1, a container 10 is shown in which has been placed a liquid 11, the viscosity of which it is desired to measure. A viscosimeter generally designated 12 is arranged in container 10 partially submerged in liquid 11. Viscosimeter 12 includes a housing 13 configured in cross section in the shape of an A or inverted V enclosing a chamber 14 and providing a space 15 between two downwardly extending portions 16 and 17. Inner walls 18 and 19 of "leg" portions 16 and 17, respectively, taper inwardly and upwardly to a flat apex wall 20. As seen more clearly in FIG. 2, a pendulum type armature 21 is suspended from wall 20 for to and fro movement between walls 18 and 19. A bracket 22 screwed to wall 20 supports a shaft 23 on which armature 21 pivotally oscillates. A magnet 24 is mounted on the upper end of armature 21. Another magnet 25 is mounted on armature 21 intermediate its length and a disc 26 is arranged on the lower end of armature 21. FIG. 3 illustrates a different arrangement for supporting armature 21. Instead of shaft 23, a torsion bar 36 is mounted on a bracket 37 which is attached to wall 20.

Electromagnets 27 and 28 are arranged on wall members 18 and 19, respectively, in chamber 14 adjacent the level of magnet 25. Two reed switches 29 and 30 are similarly mounted on wall members 18 and 19, respectively, in chamber 14 but adjacent magnet 24. Relay switches and other circuit elements are indicated at relay 31 connected to the reed switches and electromagnets by suitable electrical conductors. The circuit in relay 31 also connects to a cycle counter 32 through conductor cable 33. An off-on switch 34 is provided on cycle counter 32 for turning the viscosimeter on and off.

Operation of the viscosimeter is more clearly illustrated by the schematic arrangement of components shown in FIG. 4. Electromagnetic means 27 and 28 include driving coils $27_a$ and $28_a$ and suppression diodes $27_b$ and $28_b$. Relay 31 indicated in the dashed line block is a two-coil magnetic latching relay. Conductor leads 40, 41 and 42 in cable 33 are connected to the circuit components in the following manner. Lead 40 is connected to one terminal of driving coil $27_a$ and to one terminal of coil 43. The other terminal of coil $27_a$ is connected to contact $44_a$ of relay switch 44 through lead 45. The other contact $44_b$ of switch 44 is connected to lead 42 (signal out). Lead 46 couples the other terminal of coil 43 to switch 44 through magnetic reed switch 29. Relay switch 44 moves between contacts $44_a$ and $44_b$ between closed and open positions. Lead 41 is connected to switch 44 and to switch 47 and to one terminal of coil 48 through magnetic reed switch 30. Relay switch 47 moves between contacts $47_a$ and $47_b$ between open and closed positions. The latter contact is connected to one terminal of driving coil $28_a$ by a lead 49 and the other terminal of driving coil $28_a$ is connected to the other terminal of coil 28 by a lead 50.

As the circuit is illustrated, power through leads 40 and 41 is applied to driving coil 27$_a$ through contact 44$_a$ of relay switch 44. The lower end (magnet 25) of armature 21 is attracted toward energized electromagnet 27 until upper magnet 24 causes magnetic switch 30 to close. Closure of switch 30 changes the state of magnet latching relay 31 so that relay switch 44 opens by moving to contact 44$_b$, removing power from electromagnet 27. Switch 47 simultaneously closes by moving from contact 47$_a$ to 47$_b$ thereby applying power to electromagnet 28. Magnet 25 on the lower end of armature 21 is now attracted to and moves toward electromagnet 28 until upper magnet 24 closes magnetic reed switch 29 which again changes the state of relay 31 and the cycle is repeated.

Thus, in operation the movement of armature 21 is induced by two electromagnetic coils 27$_a$, 28$_a$, only one of which is activated at any one time.

The velocity of movement of armature 21 depends on the viscosity of fluid 11, the environmental medium surrounding armature 21; the more viscous the fluid, the slower the armature movement.

Once each cycle (to and fro movement of armature 21), when switch 44 opens upon contact with contact 44$_b$, a signal is transmitted to counter 32 to indicate completion of one cycle. The number of constant rate counts (time measurement) which occur in each cycle indicates viscosity of the fluid.

In the embodiment of the invention illustrated in FIG. 5, a different suspension arrangement for the movable member is shown. An armature 21$_a$ is secured to apex wall 20 of housing 12 at its uppermost end by means of the pivotal connection 55 of armature 21$_a$ to brackets 56 secured to wall 20. Upper and lower magnets 24$_a$ and 25$_a$, respectively, are mounted on armature 21$_a$ adjacent switches 29, 30 and electromagnets 27, 28.

FIG. 6 illustrates use of the viscosimeter in wells. The body of the viscosimeter contained in a suitable housing 60 is shown suspended in a well pipe 61 containing well fluid 11$a$ on a conductor cable 33$a$ connected through a suitable surface wellhead 62, sheave 63 and reel 64 to a power supply 65 and recorder-controller 66. An electrical impulse through the magnetic switches 29 and 30 is generated by each change of direction of movement of the armature. The frequency of the impulses is monitored with any desired type surface equipment 66 through conductor cable 33$a$ while the body of the viscosimeter carrying the armature, coils, switches and other apparatus required to generate the appropriate electrical impulse is in the oil well below the surface.

A variety of available transducers might be used to create the electrical impulses. The impulse frequency is in inverse proportion to the viscosity of the liquid medium surrounding the armature and the instrument is calibrated with standard liquids and/or gases of known viscosities.

When the viscosimeter is started in the embodiment illustrated in FIG. 5, electromagnet 27 is exerting a magnetic pull on magnet 25$a$ of armature 21$a$. The free end (magnet 25$a$) moves toward electromagnet 27. When armature 21$a$ reaches a maximum deflection, magnetic switch 29 mounted on wall 18 on which electromagnet 27 is arranged is activated which causes electromagnet 27 to switch off and the opposing electromagnet 28 on wall 19 to switch on. This causes a pull on armature 21$a$ in the opposite direction toward electromagnet 28. When armature 21$a$ approaches electromagnet 28, magnetic switch 30, mounted on the same wall 19 as electromagnet 28, is activated. Switch 30 switches electromagnet 28 off and switches electromagnet 27 on. The armature then moves back toward electromagnet 27.

The shear stress which the moving armature exerts on the liquid may be modified by attaching bodies of various shapes, such as rods, discs, spheres, etc., to the armature in order to change the drag in the viscous medium, and/or by changing the current in the electromagnetic coils. In this manner it is possible to measure thixotropy and other deviations of liquids from ideal Newtonian behavior.

Of particular advantage is that movement of the armature is caused and maintained by a continuously applied magnetic field which makes the instrument applicable for a wide range of viscosities without extra attachments to the armature or changes of the current in the coils. However, in order to achieve higher accuracy and/or resolution in a particular range of viscosity, it is desirable in an oil well where not only a detection of the gas-oil and oil-water interface is of interest, but also an accurate viscosity determination of the oil or emulsion phase is required, that the instrument be adjusted for the latter purpose.

Through proper design of the armature geometry and driving force created by the coils, viscometric measurements may be made with only a minimum disturbance of the surrounding medium. This advantageous feature makes this instrument extremely useful for measurements of emulsion and colloidal system viscosities.

Viscosities are usually required as a function of temperature. The combination of a thermistor and the viscosimeter requires only one more electrical wire connection to supply the desired temperature readings. In instances where the kinematic viscosity is desired, a density sensing device could be added to the instrument, and suitable electronics provided, if desired, to calculate an output electrical signal proportional to kinematic viscosity. To provide a continuous record, suitable standard electronic devices could be provided to produce an electrical analog signal proportional to viscosity.

In typical tests that were run, the viscosimeter measured 13 counts/cycle for an oil having a viscosity of 1.4 cp. at 75° F.; 16 counts/cycle for another oil having a viscosity of 12.7 cp. at 75° F.; and 24 counts/cycle for a third oil with a viscosity of 168 cp. at 75° F.

Various modifications can be made in the embodiments of the invention described herein without departing from the spirit and scope thereof.

Having fully described the apparatus, advantages, objects and operation of our invention, we claim:

1. Apparatus for use in measuring the viscosity of fluids comprising:
   an A-shaped housing having spaced-apart leg members and enclosing a chamber;
   an armature suspended from said housing adapted to oscillate between said leg members;
   first and second spaced-apart magnets arranged on said armature; and
   circuit means including first magnet-operable switch means arranged adjacent said first magnet on one of said leg members within said chamber, second magnet-operable switch means arranged adjacent said first magnet on the other of said leg members within said chamber;
   first electromagnetic means arranged adjacent said second magnet on said one leg member within said chamber;
   second electromagnetic means arranged adjacent said second magnet on said other leg within said chamber; and
   magnetic latching relay means adapted to alternately energize said first and second electromagnetic means in response to actuation of said first and second switch means in response to oscillation of said armature.

2. Apparatus for measuring the viscosity of fluids comprising:
   an A-shaped housing having a pair of spaced-apart leg portions;
   an armature suspended from said housing adapted to oscillate between said leg portions;
   spaced-apart, alternately energizable electromagnetic means;
   magnetic means arranged on said armature; and means for alternately energizing said electromagnetic means, including switches operable by said magnetic means, said magnetic means cooperating with said electromagnetic means to cause said armature to oscillate and including a first magnet arranged adjacent said electromagnetic means adapted to be attracted toward said electromagnetic means upon energization thereof and a second magnet arranged adjacent said switches adapted to operate said switches.

3. Apparatus for measuring the viscosity of fluids comprising:
an A-shaped housing forming a closed chamber which includes a pair of spaced-apart leg portions;
a movable member suspended from said housing adapted to oscillate between said leg portions;
two energizable means, one arranged in each leg of said chamber;
magnetic means arranged on said movable member; and means for alternately energizing said energizable means at the frequency of oscillation of the movable member in the medium in which it is positioned; said magnetic means and said energizable means cooperating to cause said movable member to oscillate.

4. Apparatus as recited in claim 3 including means for indicating velocity of oscillation of movement of said movable member to indicate viscosity of said fluids.

References Cited

UNITED STATES PATENTS

| | | | |
|---|---|---|---|
| 2,696,735 | 12/1954 | Woodward | 73—59 |
| 3,286,507 | 11/1966 | Moore | 73—54 X |
| 3,382,706 | 5/1968 | Fitzgerald et al. | 73—54 |

FOREIGN PATENTS 892,094   3/1962   Great Britain.

LOUIS R. PRINCE, Primary Examiner

JOSEPH W. ROSKOS, Assistant Examiner